United States Patent [19]
Oldham

[11] Patent Number: 5,941,070
[45] Date of Patent: Aug. 24, 1999

[54] FLEXIBLE SEALED CONDUIT SYSTEM

[75] Inventor: Dick J. Oldham, Viroqua, Wis.

[73] Assignee: Nelson Industries, Inc., Stoughton, Wis.

[21] Appl. No.: 08/903,557

[22] Filed: Jul. 31, 1997

[51] Int. Cl.⁶ ..................................................... F01N 7/00
[52] U.S. Cl. .............................. 60/322; 285/62; 285/53; 285/187; 285/231
[58] Field of Search .............................. 60/322; 285/62, 285/231, 53, 187, 300

[56] References Cited

U.S. PATENT DOCUMENTS

| | | | |
|---|---|---|---|
| 3,574,358 | 4/1971 | Cassel | 285/53 |
| 3,730,293 | 5/1973 | Cassel. | |
| 4,356,885 | 11/1982 | Dello. | |
| 4,856,822 | 8/1989 | Parker | 285/62 |
| 4,993,512 | 2/1991 | Lescher. | |
| 4,998,597 | 3/1991 | Bainbridge et al.. | |
| 5,145,215 | 9/1992 | Udell | 285/300 |
| 5,167,430 | 12/1992 | Bainbridge | 60/322 |
| 5,340,165 | 8/1994 | Sheppard | 285/226 |
| 5,354,104 | 10/1994 | Senes et al.. | |
| 5,639,127 | 6/1997 | Davey | 285/300 |

*Primary Examiner*—Thomas E. Denion
*Attorney, Agent, or Firm*—Andrus, Sceales, Starke & Sawall

[57] ABSTRACT

A fluid conduit system, including silencer systems, including intake and exhaust systems for engines, blowers, compressors, pumps, and the like, includes first (16), second (22), and third (28) pipes, and first (34, 36) and second (38, 40) flex joints each flexibly and sealingly interconnecting respective outlets and inlets of respective pipes. The flex joints include double O-ring sealing gaskets provided by first and second annular meshes (46, 48) received in respective annular grooves (50, 52) separated by a land (54), and a cloth (56) wrapped around the annular meshes and having a central web portion (58) spanning the land.

9 Claims, 3 Drawing Sheets

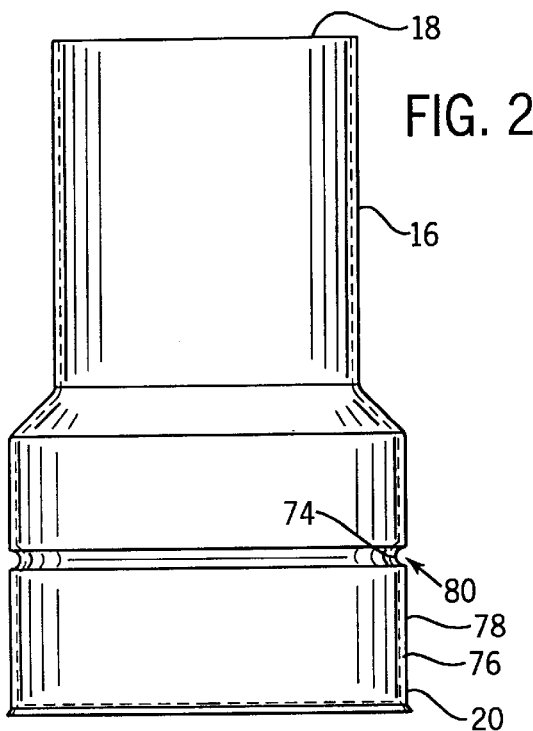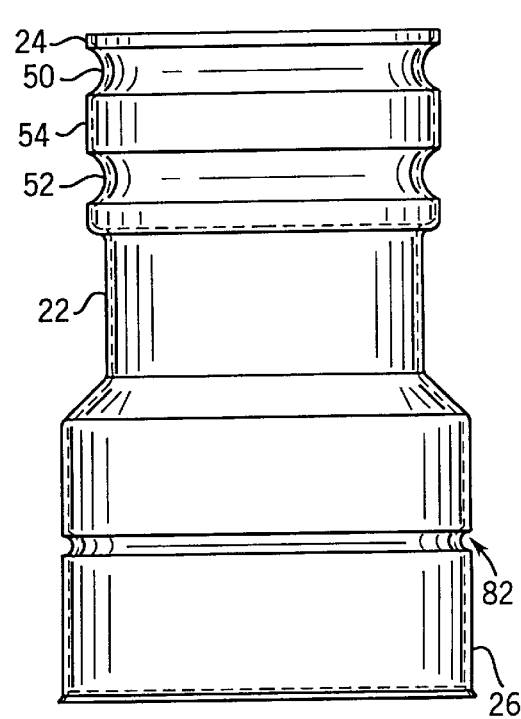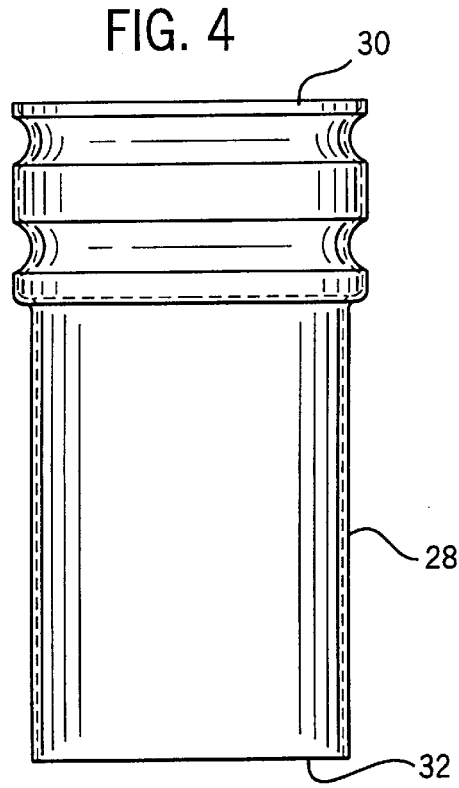

FLEXIBLE SEALED CONDUIT SYSTEM

BACKGROUND AND SUMMARY

The invention relates to fluid conduit systems, including silencer systems, including intake and exhaust systems for internal combustion engines, and for blowers, compressors, pumps, and the like, and more particularly to a system enhancing flexibility and sealing.

Conduit systems, including exhaust systems for internal combustion engines, are known in the prior art. In engine exhaust applications, exhaust pipes and components are typically connected by weld joints. When the exhaust flow path must curve or otherwise follow a nonrectilinear path, a curved exhaust pipe and/or flexible tubing is used. Flexible tubing and/or flexible joints are also commonly used for connecting exhaust pipes and components, and in numerous other conduit system applications. Flexible joints are also required to accommodate movement or vibration between an engine and an exhaust system.

The present invention provides simple effective flex joints, enhancing flexibility and sealing.

BRIEF DESCRIPTION OF THE DRAWINGS

FIG. 2 is a side view of a component of FIG. 1.

FIG. 3 is a side view of a component of FIG. 1.

FIG. 4 is a side view of a component of FIG. 1.

DETAILED DESCRIPTION

Figure 1:
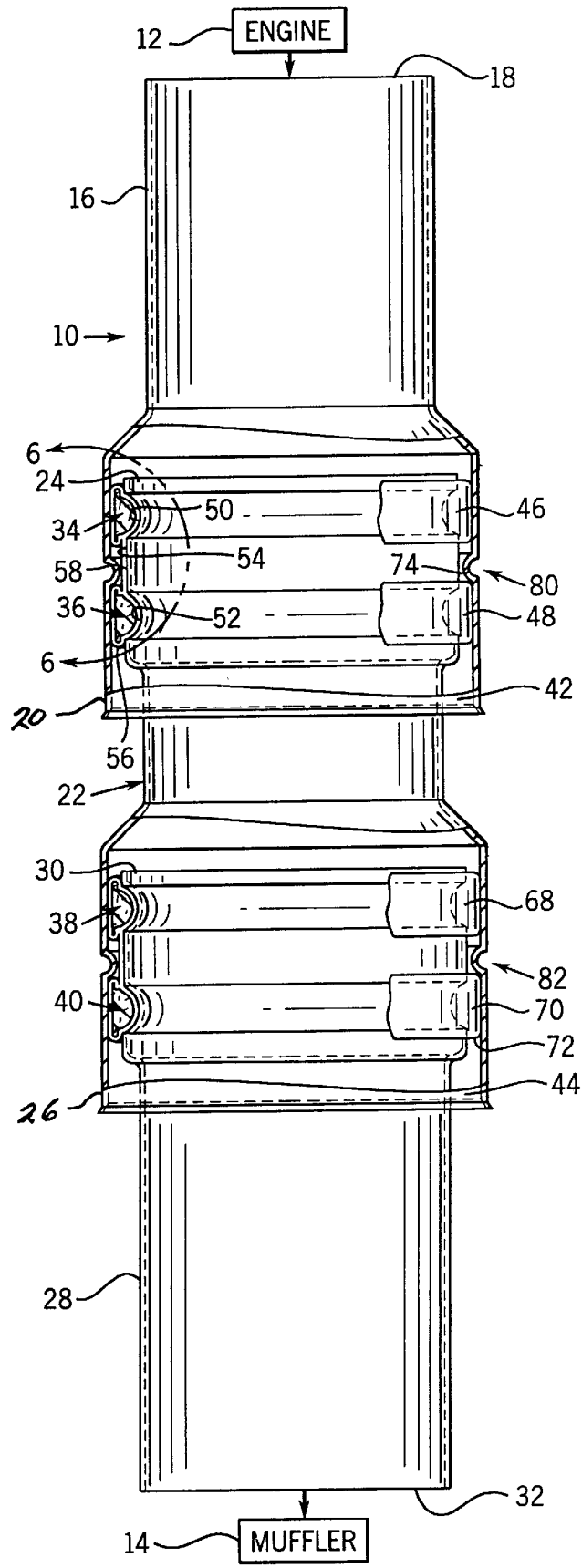
FIG. 1 is a side view, partly in section, of an exhaust system application in accordance with the conduit system of the invention.

FIGS. 1–4 show an exhaust system 10 for conducting exhaust, for example from an internal combustion engine 12 to a muffler 14. The exhaust system includes a first exhaust pipe 16 having an inlet 18 for receiving exhaust from an exhaust source such as engine 12, and having an outlet 20. The exhaust system includes a second exhaust pipe 22 having an inlet 24 for receiving exhaust from the outlet of first exhaust pipe 16, and having an outlet 26. The system includes a third exhaust pipe 28 having an inlet 30 for receiving exhaust from the outlet of second exhaust pipe 22, and having an outlet 32. A first flex joint provided by O-ring sealing gaskets 34, 36, to be described, flexibly and sealingly interconnects the outlet of first exhaust pipe 16 and the inlet of second exhaust pipe 22. A second flex joint provided by O-ring gaskets 38, 40 flexibly and sealingly interconnects the outlet of second exhaust pipe 22 and the inlet of third exhaust pipe 28.

The flex joint provided by O-ring gaskets 34, 36 permits relative movement between first and second exhaust pipes 16 and 22 along the direction of exhaust flow therethrough and also in a plane lateral thereto while still maintaining sealing. For example, the pipes may slide toward or away from each other, or one pipe may be tilted relative to the other, or one pipe may rotate relative to the other about the axis of the exhaust flow direction. The second flex joint provided by O-ring gaskets 38, 40 permits relative movement between second and third exhaust pipes 22 and 28 along the direction of exhaust flow therethrough and also in a plane lateral thereto while still maintaining sealing.

Outlet 20 of first exhaust pipe 16 overlaps inlet 24 of second exhaust pipe 22. The noted first flex joint is provided by O-ring sealing gaskets 34, 36 at such overlap, with each O-ring engaging both the outlet of first exhaust pipe 16 and the inlet of second exhaust pipe 22. Outlet 26 of second exhaust pipe 22 overlaps inlet 30 of third exhaust pipe 28. The noted second flex joint is provided by sealing O-ring gaskets 38, 40 at the overlap, with each O-ring engaging both the outlet of second exhaust pipe 22 and the inlet of third exhaust pipe 28.

Outlet 20 of first exhaust pipe 16 and inlet 24 of second exhaust pipe 22 form a first pair of telescopic ends which overlap in telescoped relation. One of such telescopic ends is a male end, e.g. end 24, and the other of such telescopic ends is a female end, e.g. end 20. Outlet 26 of second exhaust pipe 22 and inlet 30 of third exhaust pipe 28 form a second pair of telescopic ends which overlap in telescoped relation. One of such telescopic ends is a male end, e.g. end 30, and the other of such telescopic ends is a female end, e.g. end 26. Second exhaust pipe 22 has different inlet and outlet ends, e.g. inlet end 24 is a male end, and outlet end 26 is a female end.

Second exhaust pipe 22 having inlet 24 is overlapped with outlet 20 of first exhaust pipe 16 in telescoped male/female relation, defining an annulus 42 therebetween. First and second O-ring sealing gaskets 34 and 36 are in annulus 42 and engage both the outlet of first exhaust pipe 16 and the inlet of second exhaust pipe 22 and permit sliding movement thereof along the direction of exhaust flow therethrough and also movement in a plane lateral thereto, including tilting movement laterally thereof, and rotary movement, to afford the noted flexibility for a nonrectilinear exhaust flow path and/or for ease of connection of exhaust pipes or components. Inlet 30 of third exhaust pipe 28 is overlapped with outlet 26 of second exhaust pipe 22 in telescoped male/female relation, defining a second annulus 44 therebetween. Third and fourth O-ring sealing gaskets 38 and 40 are in annulus 44 and engage both the outlet of second exhaust pipe 22 and the inlet of third exhaust pipe 28 and permit sliding movement thereof along the direction of exhaust flow therethrough and also movement in a plane lateral thereto, including tilting movement laterally thereof, and rotary movement, to provide the noted flexibility.

Figure 5:
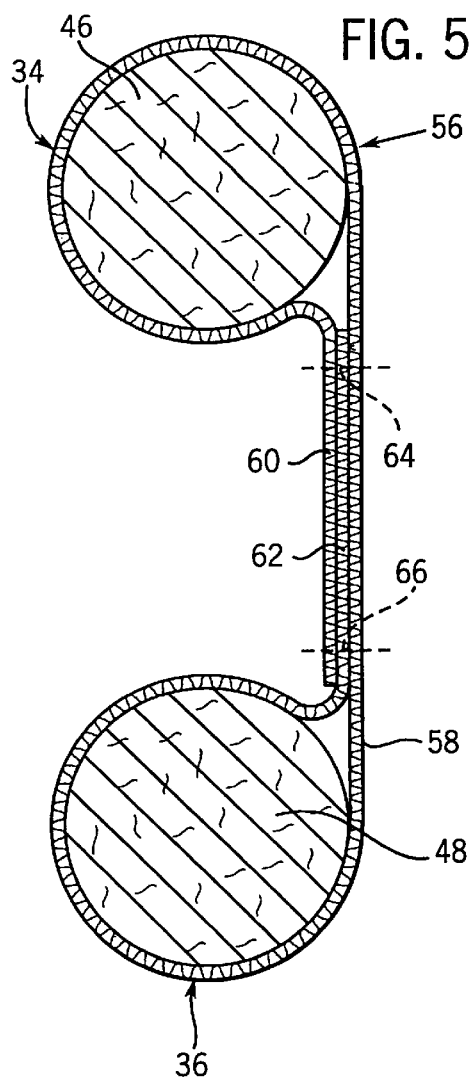
FIG. 5 is a sectional view of a component of FIG. 1.
Figure 6:
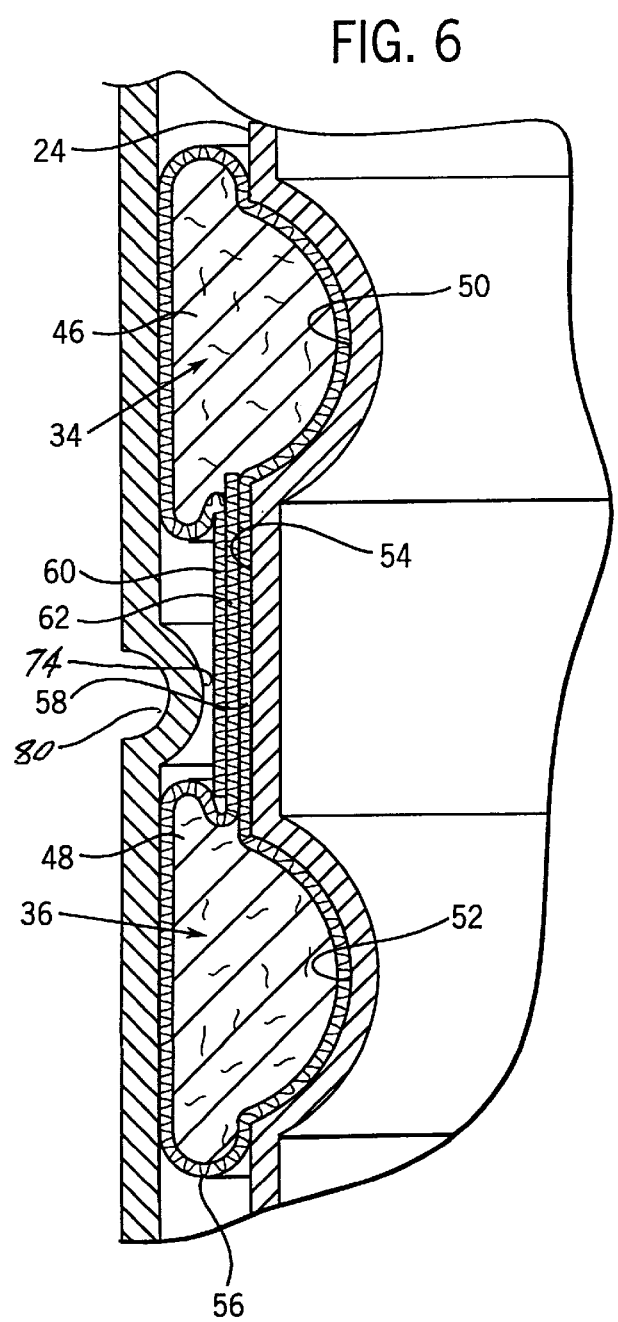
FIG. 6 is an enlarged view of a portion of FIG. 1.

First and second O-ring sealing gaskets 34 and 36 are provided by first and second high temperature exhaust tolerant annular meshes 46 and 48, FIG. 5, preferably inconel mesh, received in respective first and second annular grooves 50 and 52 around inlet 24 of exhaust pipe 22. The grooves are separated by a land 54 therebetween. A high temperature exhaust tolerant cloth 56, preferably vermacite inserted with stainless steel wire, is wrapped around annular meshes 46 and 48 and has a central web portion 58 spanning land 54. The ends 60 and 62 of the cloth are folded back onto each other and onto central web portion 58. The three layers 60, 62, 58 are sewn together at 64 and 66. This provides a barbell-like structure locating meshes 46 and 48 in respective grooves 50 and 52, and mounting and retaining meshes 46 and 48 to inlet 24 of exhaust pipe 22, and allowing deformation of meshes 46 and 48, FIG. 6, upon engagement with the inner surface of outlet 20 of exhaust pipe 16, as shown in FIG. 1, and also trapping meshes 46 and 48 within cloth 56 during the noted deformation to enhance sealing by maintaining minimum thickness of the seal while maintaining meshes 46 and 48 in place. Third and fourth O-ring sealing gaskets 38 and 40 are likewise provided by high temperature annular meshes 68 and 70 wrapped in a high temperature exhaust tolerant cloth 72, all as above described.

An annular shoulder 74, FIG. 2, is formed on the inner surface of outlet 20 of exhaust pipe 16 and extends into annulus 42 between meshes 46 and 48 and radially faces central web portion 58 of cloth 56, to further retain and locate the meshes and the cloth. Outlet 20 of exhaust pipe 16 has an annular sidewall 76 with an outer surface 78 having an annular groove 80 therein. The inner surface of the sidewall at groove 80 provides shoulder 74 extending radially inwardly into annulus 42 to a smaller inner diameter than the outer diameter of meshes 46 and 48 on opposite sides thereof. Outlet 26 of exhaust pipe 22 has an annular groove 82, functioning likewise as groove 80.

It is recognized that various equivalents, alternatives and modifications are possible within the scope of the appended claims. As noted above, the invention may be used in numerous conduit system applications, including silencer systems, including intake and exhaust systems for internal combustion engines, and for blowers, compressors, pumps, and the like.

I claim:

1. A conduit system comprising:
   a first pipe having an inlet for receiving fluid from a source, and having an outlet;
   a second pipe having an inlet overlapped with said outlet of said first pipe in telescoped male/female relation and defining an annulus therebetween, and having an outlet;
   first and second O-ring sealing gaskets in said annulus and engaging both said outlet of said first pipe and said inlet of said second pipe and permitting sliding movement thereof along the direction of exhaust flow therethrough and also movement in a plane lateral thereto, wherein said first and second O-ring sealing gaskets comprise first and second annular meshes received in respective first and second annular grooves in one of said outlet of said first pipe and said inlet of said second pipe, said grooves being separated by a land therebetween, and a cloth wrapped around said first and second annular meshes and having a central web portion spanning said land to provide a barbell-like structure locating said first and second meshes in said first and second grooves, respectively, and mounting and retaining said first and second meshes to one of said outlet of said first pipe and said inlet of said second pipe, and allowing deformation of said first and second meshes upon engagement with the other of said outlet of said first pipe and said inlet of said second pipe, and trapping said first and second meshes within said cloth during said deformation to enhance sealing while maintaining said first and second meshes in place.

2. The conduit system according to claim 1 comprising an annular shoulder on the other of said outlet of said first pipe and said inlet of said second pipe, said shoulder extending into said annulus between said first and second meshes and radially facing said central web portion of said cloth, to further retain and locate said meshes and said cloth.

3. The conduit system according to claim 2 wherein said one of said outlet of said first pipe and said inlet of said second pipe is a male end, and said other of said outlet of said first pipe and said inlet of said second pipe is a female end, said female end having a sidewall with an outer surface having a third annular groove therein, the inner surface of said sidewall at said third groove providing said shoulder extending radially inwardly into said annulus to a smaller inner diameter than the outer diameter of said first and second meshes on opposite sides thereof.

4. A conduit system comprising:
   a first pipe having an inlet for receiving fluid from a source, and having an outlet;
   a second pipe having an inlet overlapped with said outlet of said first pipe in telescoped male/female relation and defining a first annulus therebetween, and having an outlet;
   first and second O-ring sealing gaskets in said first annulus and engaging both said outlet of said first pipe and said inlet of said second pipe and permitting sliding movement thereof along the direction of exhaust flow therethrough and also movement in a plane lateral thereto;
   a third pipe having an inlet overlapped with said outlet of said second pipe in telescoped male/female relation and defining a second annulus therebetween, and having an outlet;
   third and fourth O-ring sealing gaskets in said second annulus and engaging both said outlet of said second pipe and said inlet of said third pipe and permitting sliding movement thereof along the direction of exhaust flow therethrough and also movement in a plane lateral thereto, wherein:
   said first and second O-ring sealing gaskets comprise first and second annular meshes received in respective first and second annular grooves in one of said outlet of said first pipe and said inlet of said second pipe, said first and second grooves being separated by a first land therebetween, and a first cloth wrapped around said first and second meshes and having a central web portion spanning said first land, to provide a first barbell-like structure locating said first and second meshes in said first and second grooves, respectively, and mounting and retaining said first and second meshes to said one of said outlet of said first pipe and said inlet of said second pipe, and allowing deformation of said first and second meshes upon engagement with the other of said outlet of said first pipe and said inlet of said second pipe, and trapping said first and second meshes within said first cloth during said deformation to enhance sealing while maintaining said first and second meshes in place;
   said third and fourth O-ring sealing gaskets comprise third and fourth annular meshes received in respective third and fourth annular grooves in one of said outlet of said second pipe and said inlet of said third pipe, said third and fourth grooves being separated by a second land therebetween, and a second cloth wrapped around said third and fourth meshes and having a second central web portion spanning said second land, to provide a second barbell-like structure locating said third and fourth meshes in said third and fourth grooves, respectively, and mounting and retaining said third and fourth meshes to said one of said outlet of said second pipe and said inlet of said third pipe, and allowing deformation of said third and fourth meshes upon engagement with the other of said outlet of said second pipe and said inlet of said third pipe, and trapping said third and fourth meshes within said second cloth during said deformation to enhance sealing while maintaining said third and fourth meshes in place.

5. An exhaust system comprising:
   a first exhaust pipe having an inlet for receiving exhaust from an exhaust source, and having an outlet;
   a second exhaust pipe having an inlet overlapped with said outlet of said first exhaust pipe in telescoped male/female relation and defining an annulus therebetween, and having an outlet;
   first and second O-ring sealing gaskets in said annulus and engaging both said outlet of said first exhaust pipe and said inlet of said second exhaust pipe and permitting sliding movement thereof along the direction of exhaust flow therethrough and also movement in a plane lateral thereto, said first and second O-ring sealing gaskets comprising first and second high temperature exhaust tolerant annular meshes received in respective first and second annular grooves in one of said outlet of said first exhaust pipe and said inlet of said second exhaust pipe, said grooves being separated by a land therebetween, and a high temperature exhaust tolerant cloth wrapped around said first and second annular meshes and having a central web portion spanning said land to provide a barbell-like structure locating said first and second meshes in said first and second grooves, respectively, and mounting and retaining aid first and second meshes to one of said outlet of said first exhaust pipe and said inlet of aid second exhaust pipe, and allowing deformation of said first and second meshes upon engagement with the other of said outlet of said first exhaust pipe and said inlet of said second exhaust pipe, and trapping said first and second meshes within said cloth during said deformation to enhance sealing while maintaining said first and second meshes in place.

6. The exhaust system according to claim 5 comprising an annular shoulder on the other of said outlet of said first exhaust pipe and said inlet of said second exhaust pipe, said shoulder extending into said annulus between said first and second meshes and radially facing said central web portion of said cloth, to further retain and locate said meshes and said cloth.

7. The exhaust system according to claim 6 wherein one of said outlet of said first exhaust pipe and said inlet of said second exhaust pipe is a male end, and the other of said outlet of said first exhaust pipe and said inlet of said second exhaust pipe is a female end, said female end having a sidewall with an outer surface having a third annular groove therein, the inner surface of said sidewall at said third groove providing said shoulder extending radially inwardly into said annulus to a smaller inner diameter than the outer diameter of said first and second meshes on opposite sides thereof.

8. The exhaust system according to claim 5 wherein each of said meshes is inconel mesh, and said cloth is vermacite inserted with stainless steel wire.

9. An exhaust system comprising:

a first exhaust pipe having an inlet for receiving exhaust from an exhaust source, and having an outlet;

a second exhaust pipe having an inlet overlapped with said outlet of said first exhaust pipe in telescoped male/female relation and defining a first annulus therebetween, and having an outlet;

first and second O-ring sealing gaskets in said first annulus and engaging both said outlet of said first exhaust pipe and said inlet of said second exhaust pipe and permitting sliding movement thereof along the direction of exhaust flow therethrough and also movement in a plane lateral thereto, said first and second O-ring sealing gaskets comprising first and second high temperature exhaust tolerant annular meshes received in respective first and second annular grooves in one of said outlet of said first exhaust pipe and said inlet of said second exhaust pipe, said first and second grooves being separated by a first land therebetween, and a first high temperature exhaust tolerant cloth wrapped around said first and second meshes and having a central web portion spanning said first land, to provide a first barbell-like structure locating said first and second meshes in said first and second grooves, respectively, and mounting and retaining said first and second meshes to said one of said outlet of said first exhaust pipe and said inlet of said second exhaust pipe, and allowing deformation of said first and second meshes upon engagement with the other of said outlet of said first exhaust pipe and said inlet of said second exhaust pipe, and trapping said first and second meshes within said first cloth during said deformation to enhance sealing while maintaining said first and second meshes in place;

a third exhaust pipe having an inlet overlapped with said outlet of said second exhaust pipe in telescoped male/female relation and defining a second annulus therebetween, and having an outlet;

third and fourth O-ring sealing gaskets in said second annulus and engaging both said outlet of said second exhaust pipe and said inlet of said third exhaust pipe and permitting sliding movement thereof along the direction of exhaust flow therethrough and also movement in a plane lateral thereto, said third and fourth O-ring sealing gaskets comprising third and fourth high temperature exhaust tolerant annular meshes received in respective third and fourth annular grooves in one of said outlet of said second exhaust pipe and said inlet of said third exhaust pipe, said third and fourth grooves being separated by a second land therebetween, and a second high temperature exhaust tolerant cloth wrapped around said third and fourth meshes and having a second central web portion spanning said second land, to provide a second barbell-like structure locating said third and fourth meshes in said third and fourth grooves, respectively, and mounting and retaining said third and fourth meshes to said one of said outlet of said second exhaust pipe and said inlet of said third exhaust pipe, and allowing deformation of said third and fourth meshes upon engagement with the other of said outlet of said second exhaust pipe and said inlet of said third exhaust pipe, and trapping said third and fourth meshes within said second cloth during said deformation to enhance sealing while maintaining said third and fourth meshes in place.

* * * * *